Sept. 23, 1969   J. W. RIDDEL ET AL   3,469,224
PRINTED THERMISTOR ON A METAL SHEET
Filed Dec. 8, 1966

INVENTORS
John W. Riddel, &
BY Raymond E. Schwyn
Peter P. Kozak
ATTORNEY 3,469,224
PRINTED THERMISTOR ON A METAL SHEET
John W. Riddel, Fenton, and Raymond E. Schwyn, Flint, Mich., assignors to General Motors Corporation, Detroit, Mich., a corporation of Delaware
Filed Dec. 8, 1966, Ser. No. 600,230
Int. Cl. H01c 7/04
U.S. Cl. 338—22    4 Claims

ABSTRACT OF THE DISCLOSURE

A thermistor assembly is formed by coating a nickel substrate with a film of thermistor material and subsequently heating the coated nickel substrate until a thin, adherent insulative layer of nickel oxide is formed. The nickel oxide layer insulates the nickel substrate electrically from the thermistor material and it bonds the thermistor material to the nickel substrate. After the coated nickel substrate has cooled, two electrical contacts in spaced relationship to each other are printed on top of the thermistor film. This thermistor assembly has a fast temperature response, high heat dissipation characteristics which permit the thermistor to be operated at power levels above and below one watt, and provides a sturdy construction which is not readily broken.

---

Thermistors are defined as being electrical resistors made of a material whose resistance varies sharply in a known manner with the temperature, that is, they have a medium to high temperature coefficient of resistance. Thermistor materials have low thermal conductivity and low strength. These two properties determine and limit the types of electrical devices that can be made with the thermistor materials. For example, the low thermal conductivity of the thermistor material causes an electrical circuit having a thermistor therein to have a slow temperature response. The temperature response is directly proportional to the mass of the thermistor; that is, the greater the thermistor mass, the slower the temperature response. In view of the low thermal conductivity of thermistors, it is the practice in the art to use a small bead of thermistor material having two electrical contacts connected thereto when a fast response is required. While these small thermistor beads do have a fast response, they do not have an adequate surface area from which the heat generated by the electrical current passing through the thermistor can be dissipated. As a result, these thermistor beads can only be satisfactorily used in low power devices, say of the order of one watt or less.

Thermistors having a small mass in the form of a thin disc or film are desirable since they would have a fast response due to the small mass and a large surface area available for the dissipation of heat generated in the electrical circuit. Thin thermistor discs having a thickness in the order of 10 mils are available commercially, but due to the low strength of the thermistor material, they are too fragile to have more than a limited use. Similarly, a thin film of thermistor material is even more fragile and is easily broken. Attempts to make thermistor assemblies having a film of thermistor material supported by a metal substrate have had a limited success. In thermistor assemblies of this type it is necessary to insulate the thermistor material from the metal substrate by means of an insulative layer of some type. In such an assembly, the insulative layer is usually a glass or a glass-ceramic type material. These coatings have not been satisfactory however, because coatings of this type which are thick enough to provide adequate insulation between the thermistor and the metal substrate have too much resistance to the thermal flow between the metal and the thermistor and as a result, slow the temperature response. Similarly, when the insulative layer is thin enough to allow for a swift transfer of heat between the metal and the thermistor, the insulative layer is too porous to adequately insulate the film electrically from the metal.

It is an object of this invention to provide an improved thermistor assembly having a fast temperature response and high heat dissipation characteristics and a method of making the same. It is another object of this invention to provide a thermistor assembly having a fast temperature response which is operative in electrical devices operating at power levels above and below one watt. It is yet another object of this invention to provide a thermistor assembly having a fast temperature response which is not readily broken.

These and other objects are accomplished in accordance with this invention by a thermistor assembly having a sintered thermistor film attached to and supported by a nickel substrate. Interposed between the thermistor film and the nickel substrate is a thin insulative layer of nickel oxide which bonds the film to the substrate. The nickel oxide layer insulates the film electrically from the substrate. This construction provides a sturdy thermistor assembly which has a fast temperature response and which has high heat dissipation characteristics. The thermistor assembly described above is prepared by a method in which a thin film of thermistor material is applied to a nickel substrate. The coated nickel substrate is then fired at a temperature in the range of 1900° to 2500° F. for a time sufficient to oxidize the nickel substrate adjacent the thermistor material to form an adherent layer of nickel oxide thereon. During the firing step the nickel oxide layer that is formed reacts with and combines with the thermistor film to tightly bond the sintered thermistor film to the supporting nickel substrate. Two electrical contacts in spaced relationship with each other are printed on the top of the thermistor film after the assembly has cooled.

Other objects and advantages of this invention will be apparent from the following detailed description, reference being made to the accompanying drawings wherein a preferred embodiment of this invention is shown.

Figure 1:
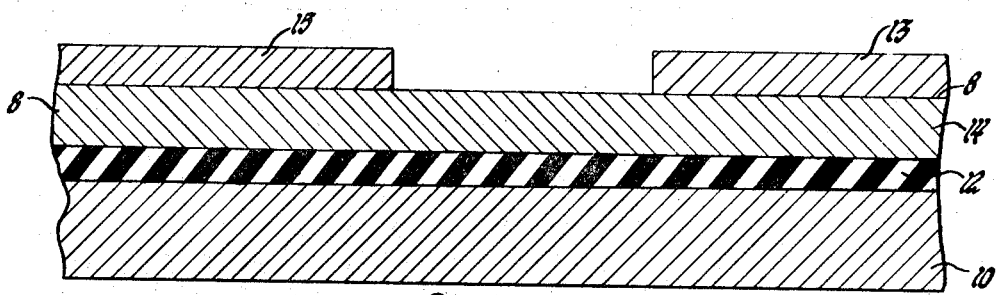
FIGURE 1 is a cross-sectional side view of the thermistor assembly in accordance with this invention.

Referring to FIGURE 1 of the drawings, the thermistor assembly 8 consists of a layer or sheet of nickel 10 which has an adherent nickel oxide layer 12 on the upper surface thereof. On top of and bonded to the nickel oxide layer 12 is a layer or film of sintered thermistor material 14. Electrical contacts 13 and 15 are on top of and bonded to the thermistor material 14.

The invention will now be described in detail in terms of a method for making this thermistor assembly. The metal supporting substrate member of the desired shape is cut from a sheet of nickel having a purity of at least 98%. High purity nickel is essential in the practice of this invention because when it oxidizes it forms an adherent oxide which serves as an electrical insulator and as a bonding layer. The surface of the nickel substrate should be clean. This can be done by rinsing in a solvent such as acetone or by any suitable means. The thickness of the nickel substrate can vary over a wide range, say for example 2 to 100 mils.

Figure 2:
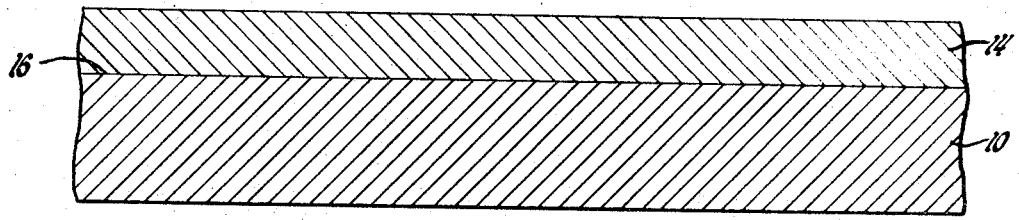
FIGURE 2 is a cross-sectional side view of a thermistor film and a nickel supporting element before heating.

The thermistor material is applied to the clean surface 16 of the nickel substrate 12 until a layer or film 14 having a depth of from 1 to 10 mils is formed as shown in FIGURE 2. Thermistor assemblies of this invention that have thermistor films 1 to 10 mils thick have a resistance of the order of 200 to 14,000 ohms at 77° F., a thermistor resistance which is suitable for use in many gauges which are operated on low voltages. The preferred thickness of this themistor film is 3 to 6 mils. Thermistor films which are thicker than 10 mils tend to slow the temperature response of the thermistor assembly due to the low conductivity of the thermistor material. Thermistor assemblies having a thermistor film of less than 1 mil have a resistance which is too high for the thermistor assembly to be operative at low voltages.

The thermistor material which is used in the practice of this invention is not critical. A broad range of thermistor compositions can be used. Most commercially available thermistor compositions contain cobalt oxide and manganese oxide and this type of thermistor composition is particularly well suited for the practice of this invention. Examples of thermistor compositions which are oprative are equal molar quantities of cobalt oxide and manganese oxide; equal molar quantities of manganese oxide, cobalt oxide and cupric oxide, and equal molar quantities of manganese oxide, cobalt oxide and nickel oxide. The particle size of the thermistor material is not critical to the practice of this invention. The particle size of the thermistor materials which worked satisfactorily are in the order of −400 mesh (American standard screen sieve size).

The thermistor material is applied to the nickel substrate by means of printing with a silk screen as is a common practice in the art. A typical thermistor ink contains on the order of 100 parts thermistor material to 25 parts of a liquid vehicle which contains a binder. Numerous commercial liquid vehicles which are specifically made for this purpose can be used. An example of a liquid vehicle that is suitable contains 60 parts by weight of a solvent, N-butyl carbitol and 5 parts of a binder, ethyl cellulose.

After the thermistor film has been applied to the nickel substrate, the assembly is placed in an oven and heated for up to 18 minutes at a temperature of between 1900° and 2500° F. The preferred heating range is 2150 to 2250° F. During this heating step the surface of the nickel substrate underneath the thermistor film is oxidized to form a layer of nickel oxide between the nickel substrate and the thermistor film. The heating step is carried out at these temperatures for a period of time sufficient to form this nickel oxide layer. The nickel oxide layer that is formed adheres tightly to the nickel substrate. During the heating step the adherent nickel oxide layer reacts with and combines with the thermistor material to tightly bond the thermistor film to the nickel substrate. In addition to bonding the thermistor film to the nickel substrate, the nickel oxide layer insulates the thermistor film electrically from the nickel substrate. The thickness of the nickel oxide layer varies from .1 to 2 mils with a preferred thickness being .5 to 1 mil. Nickel oxide layers having a thickness greater than 2 mils are not as adherent and have a tendency to flake off of the nickel substrate. Thicknesses of the nickel oxide layer less than .1 mil do not provide adequate electrical insulation between the thermistor and the nickel substrate. The resistance of the nickel oxide layer between the electrical contacts varies from 10 to 700 megohms.

During the heating step the thermistor material sinters to a certain extent depending upon the composition of the thermistor material. Most thermistor compositions based upon cobalt oxide and manganese oxide will be fully sintered in the temperature range of 2300° to 2500° F. At temperatures in the range of 1900° to 2300° F. these materials are partially sintered. It is not essential in the practice of this invention that the thermistor materials be fully sintered.

After the thermistor assembly has been cooled, electrical contacts 13 and 15 are bonded to the surface of the thermistor film by conventional means such as printing and the like. Silver contact ink which is commercially available for this purpose is well suited for this application. Silver ink which has been printed onto the thermistor film is bonded to the thermistor film by heating the assembly at a temperature ranging from 1000° to 1500° F. depending upon the composition of the silver ink. Platinum-gold ink as well as other commercial contact inks may be used for this purpose and are to be applied according to the manufacturer's suggested directions.

Example No. 1

A sheet of nickel was cleaned by rinsing in acetone. A thermistor film 6 mils thick was applied by printing through a silk screen onto the surface of the nickel substrate. The thermistor composition consisted of 1 mole manganese oxide, 1 mole cobalt oxide and 0.5 mole cuprous oxide. The thermistor composition was mixed with a liquid vehicle at a ratio of 100 parts thermistor composition to 23 parts N-butyl carbitol to 2 parts ethyl cellulose. The coated nickel substrate was placed in an oven having a temperature of 2374° F. for a period of 15 minutes. The thermistor assembly was then removed and cooled. Two silver contacts were printed on the thermistor film and bonded thereto by heating in an oven having a temperature of 1400° F. for a period of 12 minutes. The resistance of the thermistor assembly between the two contacts was 1260 ohms at 77° F. The thickness of the nickel oxide insulating layer was measured and found to be 1.3 mils and it had a resistance of 300 megohms. This thermistor assembly had a fast response and high heat dissipation characteristics.

Examples 2 through 11

The following table lists the data that were obtained on thermistor assemblies made in accordance with this invention.

| Thermistor composition, moles | | | Thermistor thickness, mils | Temp., °F. | Thermistor assembly resistance at 77° F., ohms | $NiO_2$ layer | |
|---|---|---|---|---|---|---|---|
| MnO | CoO | Other | | | | Resistance, megohms | Thickness, mils |
| Example No.: | | | | | | | |
| 1 | 1 | 1 | 0.5 $Cu_2O$ | 6 | 2,374 | 1,260 | 300 | 1.3 |
| 2 | 1 | 1 | 0.5 $Cu_2O$ | 6 | 1,933 | 209 | 120 | 0.3 |
| 3 | 1 | 1 | 0.5 $Cu_2O$ | 2 | 2,200 | 7,000 | | |
| 4 | 1 | 1 | 0.5 $Cu_2O$ | 3 | 2,200 | 2,200 | | |
| 5 | 1 | 1 | 0.5 $Cu_2O$ | 4 | 2,200 | 1,100 | | |
| 6 | 1 | 1 | 0.5 $Cu_2O$ | 5 | 2,200 | 750 | | |
| 7 | 1 | 1 | 0.5 $Cu_2O$ | 6 | 2,200 | 625 | | |
| 8 | 1 | 1 | $NiO_2$ | 6 | 2,200 | 5,300 | | |
| 9 | 1 | 1 | ZnO | 5 | 2,200 | [1] 13,200 | | |
| 10 | 1 | 1 | | 3 | 2,200 | [1] 4,600 | | |
| 11 | 1 | 1 | 0.5 $Cu_2O$ | 2 | 2,200 | [1] 3,500 | | |

[1] Different configuration.

As indicated by the data in the table above, the resistance of the thermistor assembly decreases as the thickness of the thermistor increases. It is also indicated by the data in the table that the thickness of the nickel oxide layer is higher when the heating step is carried out at a higher temperature. Examples 8, 9, 10 and 11 indicate that a wide variety of thermistor compositions can be employed in the practice of this invention.

Figure 3:
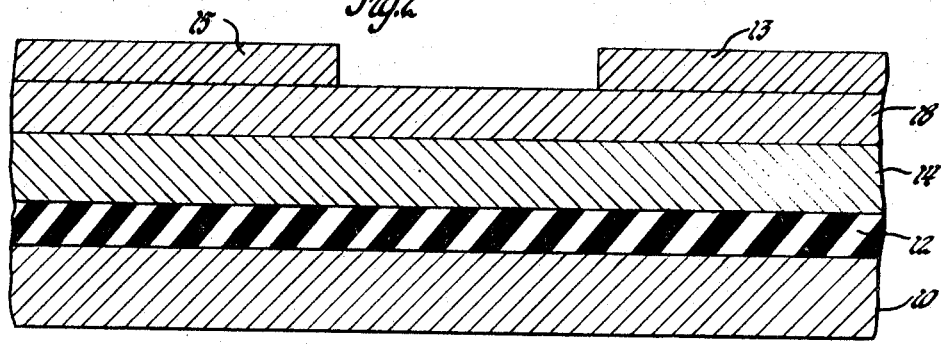
FIGURE 3 is a cross-sectional side view of a thermistor-resistor assembly.

It is well known that series and/or parallel combinations of resistors having a low temperature coefficient of resistance and thermistors having a medium to high temperature coefficient of resistance can be used to give a desired resistance versus temperature variation over a given temperature range. This invention is particularly well suited for the construction of such elements as shown in FIGURE 3 where a resistor film 18 is positioned on top of the thermistor film 14. These elements are formed by applying a film 18 of resistor material on top of the thermistor film 14 to arrive at any given thermistor-resistor configuration. Heating the coated nickel substrate at the temperatures described above causes the nickel oxide to bond both the thermistor film and the resistor film to the nickel substrate. Electrical contacts 13 and 15 are bonded to the resistor film 18 in the same manner as they were bonded to the thermistor film described previously.

Figure 4:
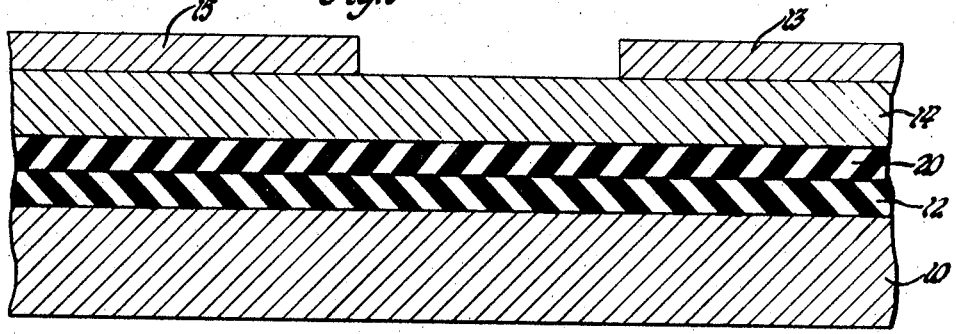
FIGURE 4 is a cross-sectional side view of a thermistor assembly having two insulative layers separating the thermistor film from the nickel substrate.

In certain applications where a high voltage is used, it may be desirable to have a higher degree of electrical insulation between the thermistor film and the nickel substrate than is provided by the nickel oxide layer. This can be accomplished as shown in FIGURE 4 by applying an insulating or semi-insulating metal oxide film 20 on top of the nickel substrate 10 before the thermistor film 14 is applied thereto. This extra insulative film would be in the range of 1 mil thick. An example of a metal oxide insulative film which is well suited for this embodiment is an equal molar weight composition of zinc oxide, manganese oxide and iron oxide. This insulating film has a resistivity of the order of about 40 megohm centimeters. Another insulating composition which is satisfactory for such use is a colloidal alumina dispersion (Du Pont Baymal). During the heating step the nickel oxide bonds both the insulative film and the thermistor film to the nickel substrate.

The thermistor assemblies made in accordance with this invention provide a fast temperature response and have a large surface area which permits the rapid dissipation of heat. The large surface area permits the use of the thermistor assembly in electrical devices where the power generated is above one watt as well as in electrical devices where the power supply is below one watt. The thermistor assembly has excellent heat transfer characteristics between the metal and the thermistor film since the metal and the thermistor film are bonded together. This thermistor assembly can be used in a wide variety of electrical devices for which thermistors are normally used. One specific application of the thermistor assembly in accordance with this invention is a thermoprobe which is described in detail in my copending patent application filed concurrently herewith.

While the invention has been described in terms of certain specific examples, it is to be understood that the scope of the invention is not limited thereby except as defined in the following claims.

What is claimed is:

1. A thermistor assembly having a fast temperature response and high heat dissipation characteristics comprising a nickel substrate, an adherent electrically insulative layer of nickel oxide 0.1–2 mils in thickness on the surface of said nickel substrate, a layer of sintered metal oxide thermistor material 1–10 mils thick on said nickel oxide, said thermistor material being bonded to said nickel substrate by the reaction product of said thermistor material and said nickel oxide, said nickel oxide layer insulating said thermistor material from said nickel substrate, and two electrical contacts on said thermistor layer in spaced relationship to each other.

2. A thermistor assembly as described in claim 1 wherein said thermistor material consists essentially of equal molar quantities of cobalt oxide, manganese oxide and cupric oxide.

3. A thermistor assembly having a fast temperature response and high heat dissipation characteristics comprising a nickel substrate, an adherent, electrically insulative layer of nickel oxide on the surface of said nickel substrate, a layer of insulative metal oxide material on said nickel oxide layer, a layer of sintered metal oxide thermistor material on said insulative layer, said thermistor material being bonded to said nickel substrate by the reaction product of said thermistor material and said nickel oxide, said nickel oxide layer and said insulative material insulating said thermistor from said nickel substrate, and two electrical contacts on said thermistor layer in spaced relationship with each other.

4. A thermistor assembly having a fast temperature response and high heat dissipation characteristics comprising a nickel substrate and an adherent, electrically insulative layer of nickel oxide on the surface of said nickel substrate, a layer of sintered metal oxide thermistor material on said insulative layer, a layer of resistor material having a low temperature coefficient of resistance on said layer of thermistor material, said thermistor material being bonded to said nickel substrate by the reaction product of said thermistor material and said nickel oxide, said nickel oxide layer insulating said thermistor material from said nickel substrate, and two electrical contacts on said resistor layer in spaced relationship with each other.

References Cited

UNITED STATES PATENTS

| 2,930,951 | 3/1960 | Burger | 317—258 X |
| 2,945,180 | 7/1960 | Parker | 338—308 X |
| 3,231,479 | 1/1966 | Gordon | 317—255 X |
| 3,259,818 | 7/1966 | Garstang | 317—258 |
| 3,353,124 | 11/1967 | Dilger | 317—258 X |
| 2,884,161 | 4/1959 | Hurd. | |

FOREIGN PATENTS 618,966  3/1949  Great Britain.

OTHER REFERENCES

Dummer, G. W.: Fixed Resistors, 1956, Pitman and Sons, London, pp. 11 and 106.

E. A. GOLDBERG, Primary Examiner

U.S. Cl. X.R.

338—308